United States Patent
Strong et al.

(10) Patent No.: US 7,069,865 B2
(45) Date of Patent: Jul. 4, 2006

(54) HIGH STRENGTH, LIGHTWEIGHT BLOW-MOLDED PLASTIC STRUCTURES

(75) Inventors: L. Curtis Strong, Clearfield, UT (US); Barry D. Mower, Layton, UT (US)

(73) Assignee: Lifetime Products, Inc., Clearfield, UT (US)

( * ) Notice: Subject to any disclaimer, the term of this patent is extended or adjusted under 35 U.S.C. 154(b) by 270 days.

(21) Appl. No.: 10/409,000

(22) Filed: Apr. 8, 2003

(65) Prior Publication Data

US 2003/0217676 A1 Nov. 27, 2003

Related U.S. Application Data

(60) Provisional application No. 60/371,486, filed on Apr. 9, 2002.

(51) Int. Cl.
*A47B 3/00* (2006.01)

(52) U.S. Cl. .................. 108/132; 108/161; 108/115

(58) Field of Classification Search ............ 108/132, 108/129, 115, 161, 901, 902
See application file for complete search history.

(56) References Cited

U.S. PATENT DOCUMENTS

| | | |
|---|---|---|
| 1,165,991 A | 12/1915 | Maggs |
| 2,689,158 A | 9/1954 | Mahr |
| 3,357,729 A | 12/1967 | Krueger |
| 3,635,432 A | 1/1972 | Hollander |
| 3,718,306 A | 2/1973 | Murray |
| 4,759,296 A | 7/1988 | Simpson |
| 5,014,628 A | 5/1991 | Roberts |
| 5,271,338 A | 12/1993 | Bonham |
| 5,623,882 A | 4/1997 | Price |
| 5,626,339 A | 5/1997 | Schickert et al. |
| 5,636,578 A | 6/1997 | Rizzi |
| 5,694,865 A | 12/1997 | Raab |
| 5,868,081 A | 2/1999 | Raab |
| 5,921,623 A | 7/1999 | Nye et al. |
| 5,947,037 A | 9/1999 | Hornberger et al. |
| 5,983,807 A | 11/1999 | Tarnay et al. |
| 6,058,853 A | 5/2000 | Pinch |
| 6,058,854 A | 5/2000 | Tarnay et al. |
| 6,112,674 A | 9/2000 | Stanford |
| 6,615,743 B1 | 9/2003 | Nien |
| 6,651,568 B1 * | 11/2003 | Buono .................. 108/132 |
| 6,655,301 B1 * | 12/2003 | Stanford ............... 108/132 |
| D489,557 S | 5/2004 | Strong et al. |
| 6,732,663 B1 | 5/2004 | Tsai |
| 6,877,441 B1 * | 4/2005 | Zheng .................. 108/130 |
| 2003/0005864 A1 | 1/2003 | Wen |
| 2003/0106474 A1 | 6/2003 | Buono |
| 2003/0177962 A1 | 9/2003 | Stanford |
| 2003/0233967 A1 | 12/2003 | Lin |
| 2004/0031422 A1 | 2/2004 | Wong |

* cited by examiner

*Primary Examiner*—Jose V. Chen
(74) *Attorney, Agent, or Firm*—Workman Nydegger

(57) ABSTRACT

Blow molded plastic structures are provided for use in various structures such as, but not limited to, tables, chairs, walls, backboards, storage bins, sports equipment and the like. The blow molded plastic structure has a first surface and a second surface extending between a first end and a second end and forming a chamber there between. A plurality of depressions is formed on the second surface and extends into the chamber. The depressions are usually unitary structures formed by a depression wall. Generally, the steeper the depression wall, the more strength is provided to the structure. In addition, where the plurality of depressions has a low profile and a greater density, increased strength is provided to the structure. The depressions may or may not be joined to the first surface.

30 Claims, 9 Drawing Sheets

HIGH STRENGTH, LIGHTWEIGHT BLOW-MOLDED PLASTIC STRUCTURES

CROSS-REFERENCE TO RELATED APPLICATIONS

This application claims priority to and the benefit of U.S. Provisional Patent Application Ser. No. 60/371,486, entitled UTILITY TABLE WITH BLOW-MOLDED TABLE TOP, which was filed on Apr. 9, 2002, and is hereby incorporated by reference in its entirety.

BACKGROUND OF INVENTION

1. Field of Invention

The present invention generally relates to structures constructed from blow-molded plastic and, in particular, to high-strength, lightweight blow-molded plastic structures.

2. Description of Related Art

It is known to construct various objects and items, such as tables, chairs, partitions, walls, and sports equipment, from plastic. It is also known to construct some of these and other objects from blow-molded plastic. As known to those skilled in the art, blow-molded structures include an outer wall that encloses a hollow interior space. Because blow-molded structures include a hollow interior space, many blow-molded structures are not high-strength. In fact, many known blow-molded structures are relatively low-strength and are unable to support a relatively large amount of weight or force.

In order to increase the strength of conventional blow-molded structures, it is known to add strengthening ribs. For example, known tables with table tops constructed from blow-molded plastic may include strengthening ribs attached to the underside of the table top in an attempt to increase the strength of the table top. The strengthening ribs are often constructed from metal because metal ribs are high strength. Disadvantageously, the metal ribs must be attached to the table top by mechanical fasteners such as bolts or screws. The bolts or screws require holes in the table top, which may create stress concentrations and/or potential failure points in the table top. Alternatively, the metal ribs may be attached to the table top by adhesives, but the adhesives may also decrease the structural integrity of the table top and make the table top very difficult to repair or replace. In addition, the metal ribs increase the number of components required to construct the table and increase the time required to manufacture the table. Thus, while it is known to use metal ribs to increase the strength of a blow-molded table top, metal ribs undesirably increase the time and costs to manufacture the table. Further, the attachment of the metal ribs to the table top may decrease the strength and/or structural integrity of the table top, and increase the potential causes of failure of the table.

Conventional table tops constructed from blow-molded plastic may also include strengthening ribs or beams that are integrally formed in the table top. For example, strengthening ribs may be formed in the underside of the center of the table a top to prevent sagging. These strengthening ribs are generally large, elongated portions that extend along the length or width of the table top. The strengthening ribs may increase the overall strength or structural integrity of the table top, but the ribs require thicker outer walls so that the large, elongated ribs are correctly formed in the table top. The large strengthening ribs also require thicker outer walls so that the ribs do not undesirably sag or deform during the manufacturing process. Disadvantageously, the thicker outer walls of the ribs require additional plastic materials be used to create the table tops, which increases the costs and weight of the table tops. In addition, the thicker outer walls retain more heat during the manufacturing process. Thus, a longer cooling time is required during the manufacturing process in order to allow the thicker outer walls to cool. This undesirably increases the time of the manufacturing process because the blow-molded table tops cannot be removed from the mold until the tops are sufficiently cooled.

Known table tops constructed from blow-molded plastic may include several large strengthening ribs to strengthen various portions of the table top. For example, strengthening ribs may be placed near the opposing ends of the table top in order to increase the strength of the ends of the table top. Additionally, as discussed above, strengthening ribs may be placed near the center of the table top to help prevent the table top from undesirably bending and to allow the table top to support additional weight. These strengthening ribs often protrude downwardly from the underside of the table top and the ribs often have large profiles to create relatively strong supporting structures. Disadvantageously, the large, protruding ribs may undesirably decrease the amount of room underneath the table top and limit the potential design considerations for the table top.

Conventional table tops constructed from blow-molded plastic and including strengthening ribs may still not have sufficient strength and may allow a portion of the table top to sag. In order to increase the strength of these conventional table tops, it is known to increase the number of ribs. These additional ribs require a larger area on the underside of the table top, which limits the area that other features may be formed in the table top. The plurality of strengthening ribs may also interfere with other desired features or components of the table, such as interfering with the folding of the table legs into a collapsed position. The ribs may also further increase the cooling time and manufacturing time of the table top.

Additionally, while the large strengthening ribs may prevent large portions of the table top from sagging, the ribs may allow smaller, localized portions of the table top to sag. In particular, because the distance between the table top and the bottom portion of the rib is greater than the distance between the upper and lower surfaces of the table top, this may allow localized portions of the table top to sag. Additionally, because the strengthening ribs are large and have an elongated length, they support the localized portion of the table top differently than the other portions of the table top. Thus, the upper surface of the table top may be uneven because different portions of the table top are supported differently.

BRIEF SUMMARY OF INVENTION

A need therefore exists for structures constructed from blow-molded plastic that eliminates the above-described disadvantages and problems.

One aspect of the invention is structures that are constructed from blow-molded plastic may have increased strength. Preferably the increased strength blow-molded plastic structures are also lightweight.

Another aspect is the blow-molded plastic structures may include two opposing surfaces. The two opposing surfaces are preferably separated by a generally constant distance. One of the opposing surfaces may be generally planar and the other surface may include a plurality of depressions that are sized and configured to increase the strength of the blow-molded structure. The depressions may cover only a portion of the surface, substantially all of the surface, or the entire surface.

Yet another aspect is the blow-molded plastic structures may be used to create a wide variety of items and objects such tables, chairs, walls, storage bins, sports equipment and the like. In particular, structures such as tables and basketball backboards may be constructed from blow-molded plastic. Desirably, the upper surface of the tables and the front surface of the backboards are generally planar, while the bottom or rear surfaces include a plurality of depressions.

Still another aspect is the distance between the depressions formed in the blow-molded structures may be substantially decreased, which substantially increases the number of depressions formed in the blow-molded structure. This increase in the number of depressions formed in the blow-molded structure at first appears to increase the amount of plastic material required to construct the structure because of the increased surface area and number of depressions. The increased number of depressions with the increased amount of plastic also appears to increase the time the structure must be cooled during the manufacturing process. In particular, the increased amount of plastic may retain more heat which would require a longer cooling time before the structure could be removed from the mold. This increases the cycle time required to construct the blow-molded structures because the structures could not be removed as quickly from the mold. The increased number of depressions and closer spacing of the depressions, however, allows the outer wall of the blow-molded structure to be constructed from thinner plastic. Thus, contrary to conventional blow-molded structures, increasing the number of depressions allows blow-molded structures with thinner walls to be constructed.

Significantly, the increased number of depressions and thinner outer walls allow less plastic to be used to construct the blow-molded structure. The reduced amount of plastic advantageously saves materials and resources. In addition, the costs of the blow-molded structure may be decreased because less plastic is required.

A further aspect of the blow-molded structures is the increased number of depressions and thinner outer walls, which results in less materials being used to construct the structures, also reduces the weight of the blow-molded structures. Thus, lightweight blow-molded structures can be constructed.

A still further aspect of the blow-molded structures is the thinner outer walls allow heat to be dissipated more quickly during the manufacturing process. Because the thinner outer walls allow heat to be dissipated more quickly, the blow-molded structures may cool more quickly in the mold. This may allow structures to be removed sooner from the mold. Additionally, because the increased number of depressions provides more support for the opposing surfaces, the structures may be removed from the mold at a higher temperature. Accordingly, the manufacturing time and/or cycle time required to construct the blow-molded structures may be reduced, which may increase the output and/or efficiency of the blow-molding process.

Yet another aspect of the blow-molded structures is conventional reinforcing ribs and beams are not required. In fact, reinforcing ribs or beams are desirably not formed in the blow-molded structures because the ribs may require thicker outer walls and increase the time of the manufacturing process. Further, the reinforcing ribs may undesirably interfere with other structures or features formed in the table top.

A further aspect is the depressions are preferably uniformly spaced to create generally consistent and/or standardized arrangements. A consistent arrangement of the depressions may help create a structure with uniform characteristics. For example, a generally constant pattern of depressions may create a structure with generally uniform strength and structural integrity.

Another aspect is the blow-molded structures may have a lower profile because reinforcing ribs are not required. Thus, the height or thickness of the blow-molded structures may be decreased.

Advantageously, blow-molded structures may be constructed with a surface that is generally planar. In particular, blow-molded structures with large generally planar surfaces for articles such as tables and basketball backboards may be constructed. Desirably, the closely spaced depressions allow large planar surfaces to be created that do not include significant sags, ripples or uneven surfaces.

These and other aspects, features and advantages of the present invention will become more fully apparent from the following detailed description of preferred embodiments and appended claims.

BRIEF DESCRIPTION OF DRAWINGS

The appended drawings contain figures of preferred embodiments to further clarify the above and other aspects, advantages and features of the present invention. It will be appreciated that these drawings depict only preferred embodiments of the invention and are not intended to limits its scope. The invention will be described and explained with additional specificity and detail through the use of the accompanying drawings in which.

DETAILED DESCRIPTION OF PREFERRED EMBODIMENTS

This invention is generally directed towards blow-molded structures that have increased strength and/or are lighter weight. The principles of the present invention, however, are not limited to blow-molded structures with increased strength and lighter weight. It will be understood that, in light of the present disclosure, the blow-molded structures which are disclosed herein can be successfully used in connection with other types of blow-molded structures that do not have increased strength or lighter weight.

Additionally, to assist in the description of the blow-molded structures, words such as top, bottom, front, rear, right and left are used to describe the accompanying figures. It will be appreciated, however, that the blow-molded structures can be located in a variety of desired positions—including various angles, sideways and even upside down. A detailed description of the blow-molded structures that may have increased strength and/or are lighter weight now follows.

Figure 1:
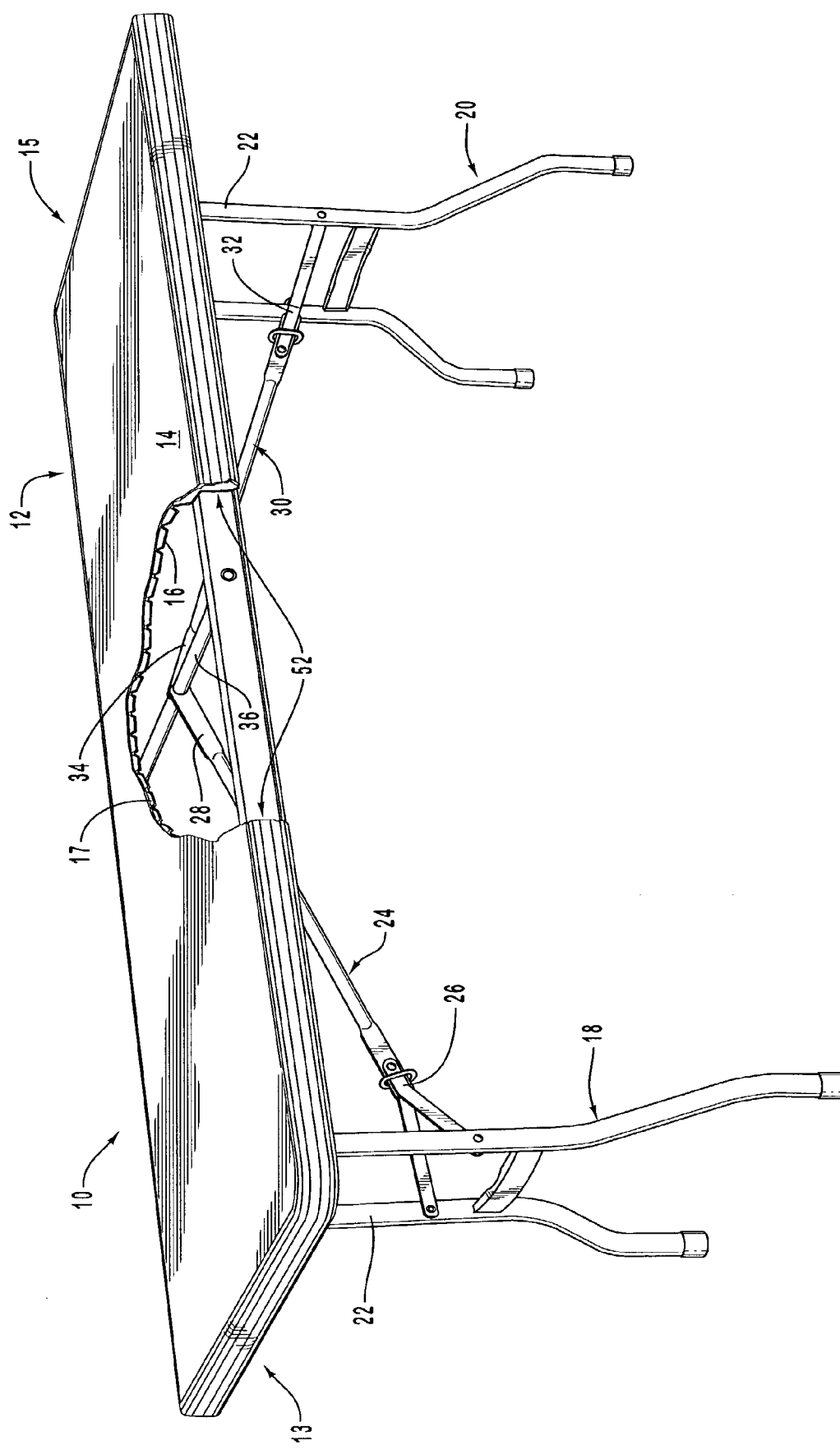
FIG. 1 is a top perspective view of an exemplary embodiment of a blow-molded structure in accordance with one embodiment of the present invention, illustrating a table with a blow-molded plastic table top.
Figure 7:
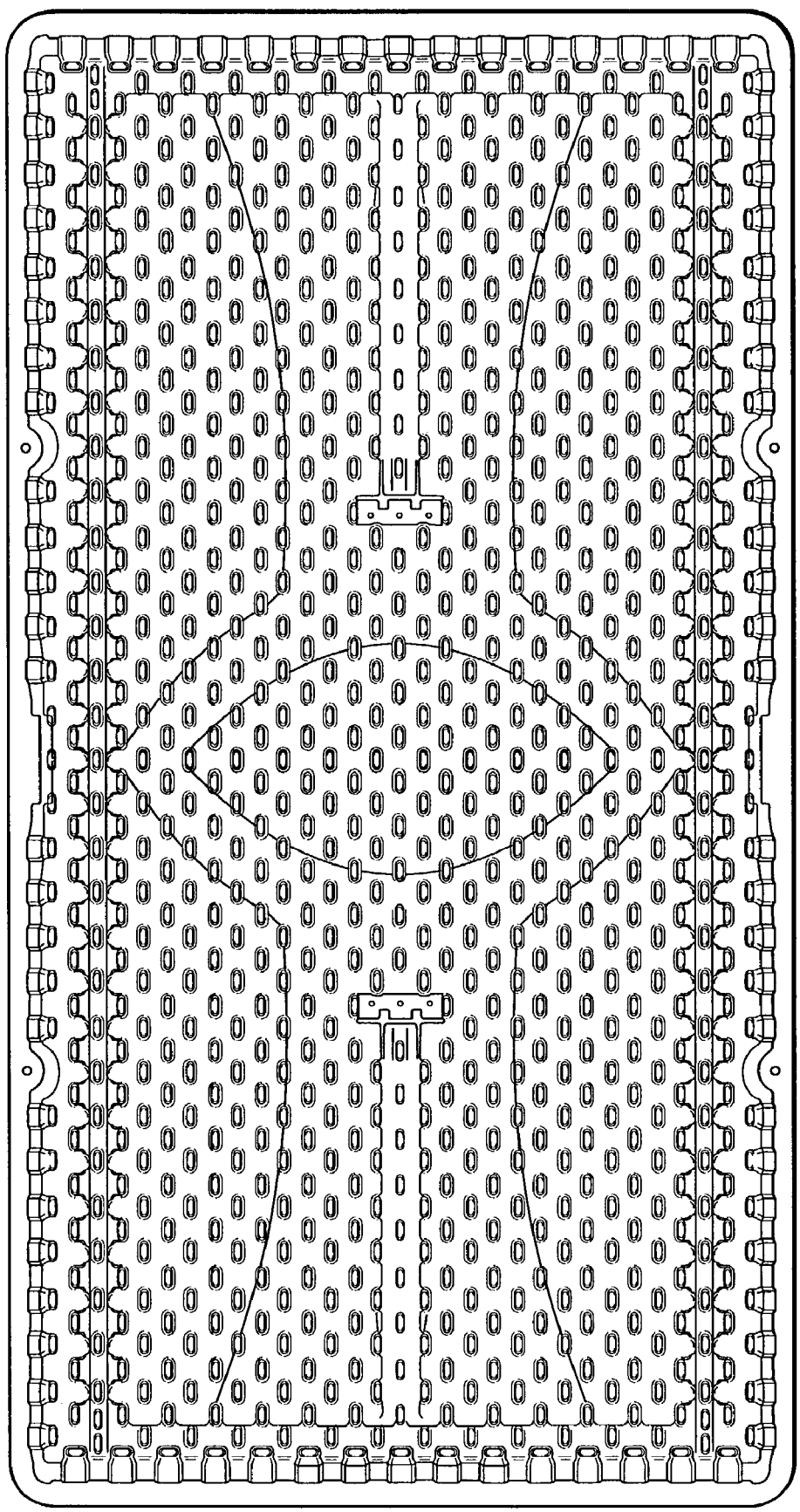
FIG. 7 is a perspective view of another exemplary embodiment of a blow-molded structure in accordance with yet another embodiment of the invention.
Figure 8:
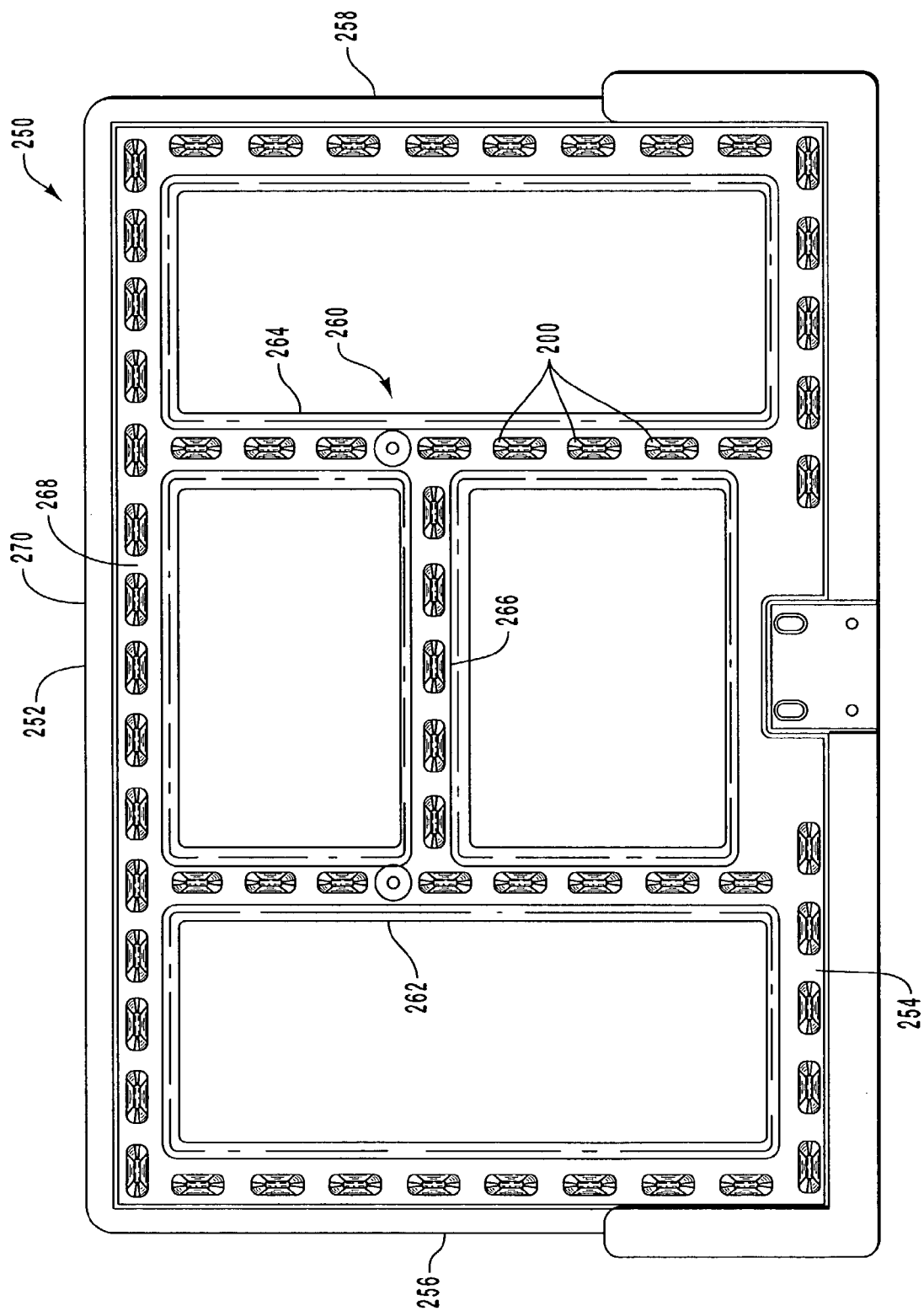
FIG. 8 is a front view of another exemplary embodiment of a blow-molded structure in accordance with a further embodiment of the invention, illustrating a basketball backboard.
Figure 9:
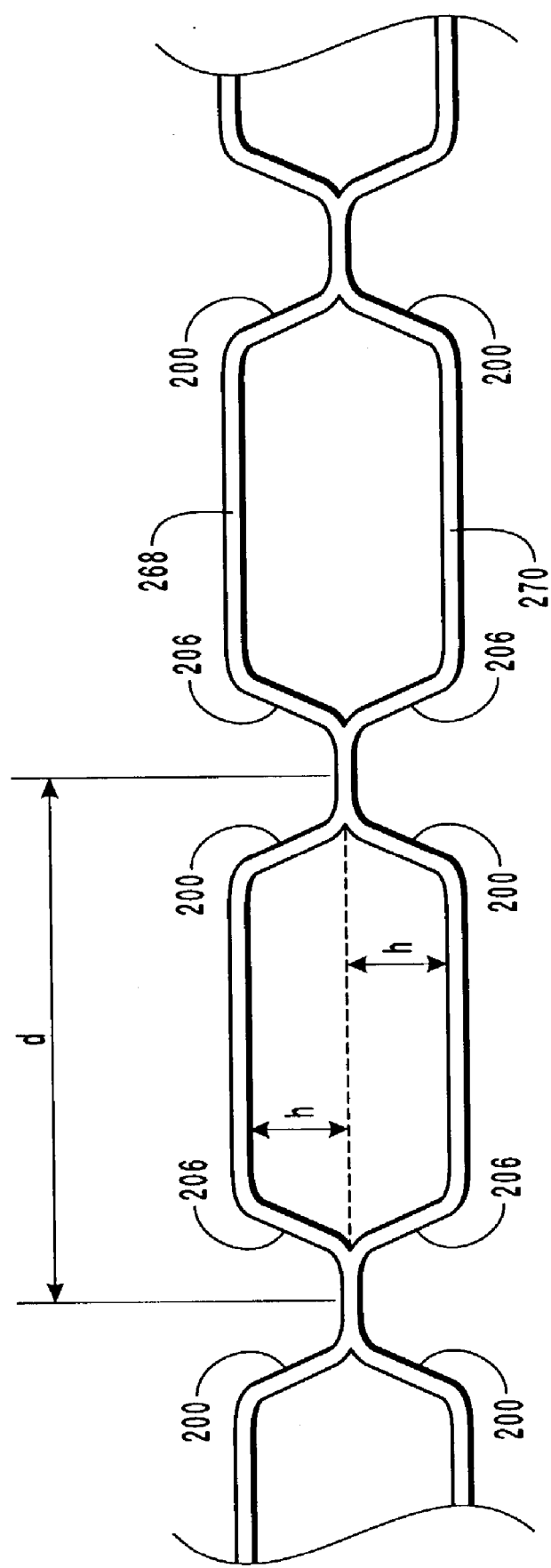
FIG. 9 is a cross-sectional side view of a blow-molded structure in accordance with a still further aspect of the invention, illustrating depressions formed in opposing surfaces of a blow-molded structure.

As seen in FIG. 1, a table 10 with a table top 12 constructed from blow-molded plastic is one exemplary embodiment of a blow-molded plastic structure that may be constructed with increased strength and/or lighter weight. It will be appreciated, however, that a wide variety of blow-molded plastic structures may have increased strength and/or lighter weight, including, for example, tables, chairs, walls, partitions, basketball backboards, storage bins, sporting equipment, and the like. Thus, while the tables shown in FIGS. 1–7 and basketball backboards shown in FIGS. 8 and 9 are examples of blow-molded structures that may have increased strength and/or lighter weight, one skilled in the art will appreciate that other blow-molded structures with increased strength and/or lighter weight may be constructed.

Figure 2:
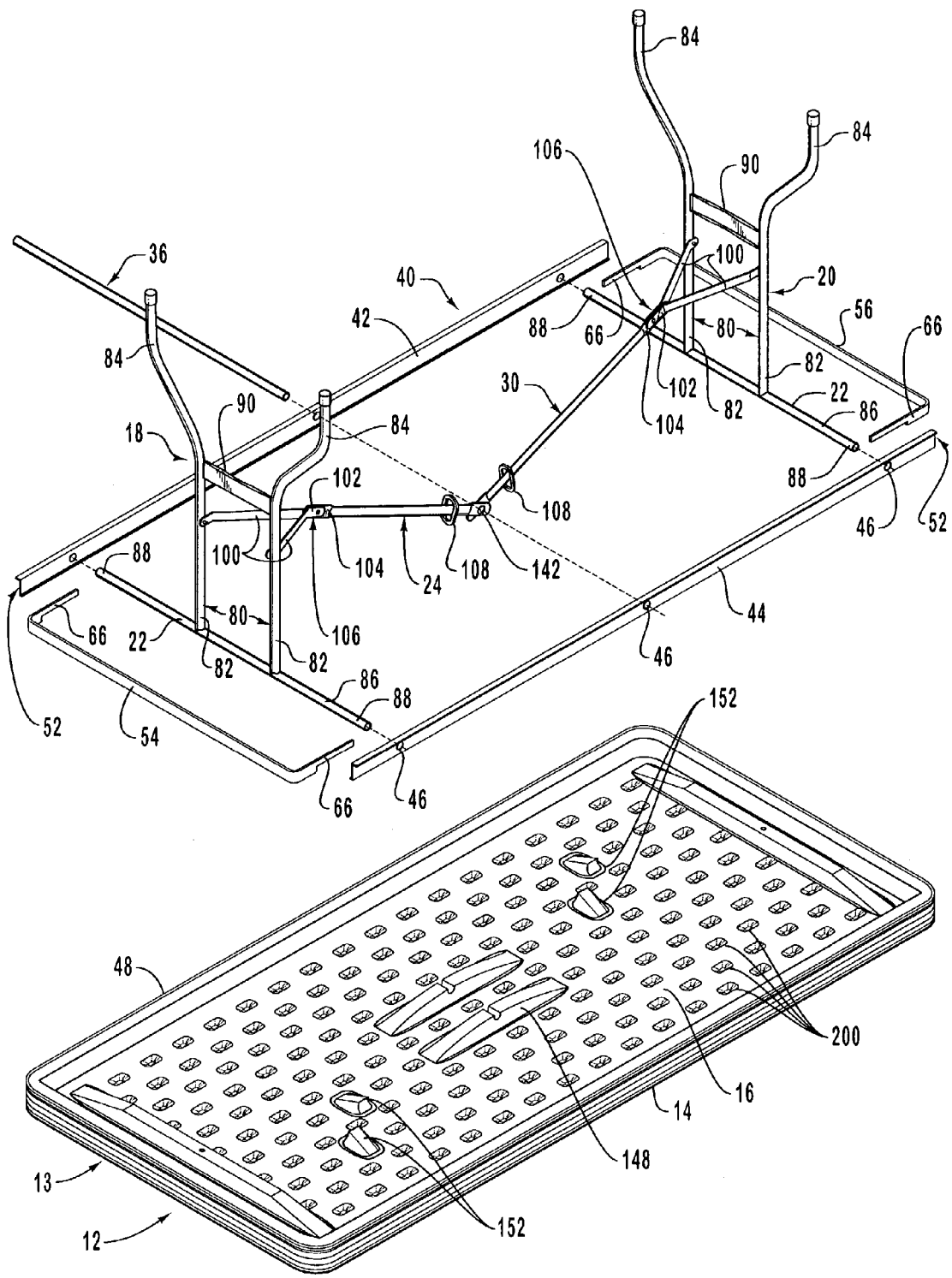
FIG. 2 is an exploded, bottom perspective view of the table shown in FIG. 1, illustrating the frame and legs detached from the table top.

As shown in FIGS. 1 and 2, table top 12 includes a first end 13, an upper or working surface 14, a second end 15, and a lower or mounting surface 16. The table top 12 is supported by a first support pedestal or leg 18 and a second support pedestal or leg 20. A chamber 17 is disposed between the upper surface 14 and the lower surface 16, and the chamber is generally hollow. It will be appreciated that the generally hollow chamber 17 may include one or more structures disposed within the chamber such that it is generally hollow or the chamber may be completely hollow.

The first and second legs 18, 20 are preferably movable between a first position in which the legs extend outwardly from the table top 12 as shown in FIG. 1 and a second collapsed or storage position in which the legs are positioned near and generally parallel to the lower surface 16 of the table top. In particular, the first and second legs 18, 20 may each include a first end 22 that is connected to the table top 12 and/or a frame 40. Additionally, a first support brace 24 may be connected to the first leg 18 and a second support brace 30 may be connected to the second leg 20. In greater detail, the first support brace 24 may have a proximal end 26 attached to first leg 18 and a distal end 28 attached to a cross bar 36. Similarly, the second support brace 30 may have a proximal end 32 connected to the second leg 20 and a distal end 34 attached to the cross bar 36. The cross bar 36 may be connected to the table top 12 and/or the frame 40. As shown in FIG. 2, the distal end 28 of the first support brace 24 may be disposed next to or it may abut the distal end 34 of the second support brace 30.

As shown in FIG. 2, the frame 40 includes a first side rail 42 and an opposing second side rail 44. Preferably, the first side rail 42 is disposed substantially parallel to the second side rail 44, and the side rails preferably extend generally along the length of the table top 12. The length and configuration of the side rails 42, 44 may depend, for example, upon the length and configuration of the table top 12. In addition, the side rails 42, 44 may extend only a portion of the length of the table top 12. The side rails may include one or more apertures 46 that are sized and configured to facilitate attachment of the legs 18, 20 and the cross bar 36 to the frame 40. The frame 40 may also include a first end rail 54 and an opposing second end rail 56 if desired. The end rails 54, 56 may include tab members 66 that are sized and configured to allow the end rails to be attached to the side rails 42, 44. Advantageously, the side rails 42, 44 of the frame 40 may help prevent bowing, twisting, or deformation of table top 12, but it will be appreciated that table 10 does not require the use of a frame or side rails.

The frame 40 may be attached to a downwardly extending lip 48 located near the outer periphery of the table top 12. For example, the frame 40 may be attached to an inner surface of the downwardly extending lip 48 by one or more fasteners. It will be understood that other suitable means or methods for attaching the frame 40 to the table top 12 may be employed, including, but not limited to, rivets, screws, bolts, glues, epoxies, or other bonding materials. The height of the inner surface of the lip 48 is preferably generally equal to or greater than the height of the frame 40 so that the frame is generally hidden from view when the table 10 is viewed from a plane generally aligned with the upper surface 14 of the table top 12. Advantageously, because the frame 40 may be completely or generally hidden from view, the frame does not have to be finished and it may contain visible imperfections or flaws. In addition, because the frame 40 may be completely or generally hidden from view by the lip 48, a more aesthetically pleasing table 10 may be created. The lip 48 may also hide all or a portion of pivotal connection of the legs 18, 20 to the table top 12. It will be appreciated, however, that the lip 48 does not have to hide all or a portion of the frame 40 or the pivotal connection of the legs 18, 20 to the table top 12.

The connection of the frame 40 to the table top 12 may also be hidden from view by the lip 48. For example, as discussed above, one or more fasteners may be used to connect the frame 40 to the table top 12. Because the fasteners desirably extend only through the frame 40 and the inner surface of the lip 48 and not the outer surface of the lip, the fasteners are preferably not visible when the table 10 is viewed from a plane that is generally aligned with or above the table top 12.

Advantageously, because the frame 40 can be attached to the lip 48, no screws or bolts have to be attached to the bottom surface 16 of the table top 12. Because no holes have to be drilled or formed in the bottom surface 16 of the table top 12, no stress concentrations or failure points are formed in the table top 12. Thus, the strength and structural integrity of the table top 12 is not compromised by creating holes in the table top. In addition, because the frame 40 is preferably not bonded to the bottom surface of table top 12, the table top is not weakened or damaged by adhesive. Thus, strength and integrity of the table top 12 may be retained because the frame 40 is not screwed, bolted or bonded directly to bottom surface 16 of the table top. Further, the attachment of the frame 40 to the lip 58 may reduce the stresses imposed on the bottom surface 16 of the table top 12, which may reduce the likelihood of deformation or damage to the table top.

As shown in FIGS. 1 and 2, the lip 48 is disposed about the periphery of the table top 12 and it may form at least part of an outer edge or boundary of table top. It will be appreciated that the lip 48 does not have to create the outer edge or boundary of the table top 12 and the lip can extend around all or only a portion of table top 12. The lip 48 is preferably integrally formed with the table top 12 during a blow-molded process to create a unitary, one-piece structure. It will be understood that the table top 12 and the lip 48 may also be formed from two or more pieces that are subsequently attached by any suitable mechanism or method such as fasteners, adhesives, and like.

FIGS. 1 and 2 also show the side rails 42, 44 of the frame 40 preferably having a generally S-shaped cross section with a main body portion and two outwardly extending flanges. One flange is preferably positioned proximate the lower portion of lip 48 and the other flange is preferably positioned proximate the bottom surface 16 of table top 12. It will be appreciated that the flanges may either contact or be spaced apart from the lower portion of the lip 48 or the bottom surface 16, respectively, as desired. When the main body portion of the side rails 42, 44 is spaced apart from lip 48, a channel 52 is located between the side rails and the lip. It will be understood that the frame 40, side rails 42, 44, and lip 48 may have other suitable configurations and arrangements depending, for example, upon the intended size and use of the table 10. In particular, the frame 40, side rails 42, 44, and lip 48 may have other configurations and arrangements if the table top 12 is in the form of a circle, polygon, square, triangle, or any other suitable geometrical configuration.

As discussed above, the legs 18, 20 may be connected to the frame 40. As best seen in FIG. 2, each leg 18, 20 includes a pair of generally parallel members 80 with a first end 82 and a second end 84. The first end 82 of each generally parallel member 80 is secured to a cross bar 86 that is sized and configured to be positioned within opposing apertures 46 formed in the side rails 42, 44 of the frame 40. The cross bars 86 preferably rotate within the apertures 46 when the legs 18, 20 are moved between the collapsed position and the extended position. In one embodiment, a connector 90 is preferably disposed between respective pairs of the generally parallel members 80 to assist in maintaining the desired relationship of the generally parallel members.

It will be appreciated that the legs 18, 20 may be configured in a variety of ways and the legs may have other suitable designs, shapes and sizes. For example, the legs 18, 20 may include only a single elongated member or multiple elongated members, and the legs may be constructed as a single component or multiple components that are connected together. It will further be appreciated that the legs 18, 20 need not be in pivotal engagement with table top 12 to be collapsible. For example, the legs 18, 20 may be detachably connected to the table top 12 such that when it is desired to collapse the table 10 for storage, the legs are detached from the table top.

As discussed above, the support braces 24, 30 are connected to the legs 18, 20. Preferably, the proximal ends 26, 32 of the support braces 24, 30 include a pair of arms 100 to facilitate attachment to the generally parallel members 80 of the legs 18, 20. It will be appreciated, however, that the legs 18, 20 and the support braces 24, 30 may have any suitable configuration and arrangement depending, for example, upon the size and intended use of the table 10. The support braces 24, 30 may also include a locking collar or ring 108 that is slidably disposed on at least a portion of the support brace. The locking collar 108 is preferably sized and configured to fit over overlapping portions 102 and 104 of the support braces 24, 30 when the legs 18, 20 are in the extended position. Advantageously, the locking collar 108 may be used to secure the legs 18, 20 in the extended position. It will be understood that other mechanisms may be utilized to lock the legs 18, 20 in the extended position.

As best shown in FIGS. 1 and 2, the distal ends 28, 34 of each support brace 24, 30 is connected to the cross bar 36. In one embodiment, the distal ends 28, 34 of each support brace 24, 30, respectively, may include an opening 142 to allow the support brace 24, 30 to be pivotally connected to the cross bar 36. The cross bar 36 may provide structural support to the center of table top 12 and the cross bar may be connected to the frame 40. It will be appreciated that the cross bar 36 does not have to be connected to the frame 40 and a variety of other suitable mechanisms may be used to connect the distal ends 28, 34 of the support braces 24, 30 to the table top 12.

Tables with other suitable features and configurations are disclosed in Assignee's U.S. Pat. No. 6,112,674, entitled Portable Folding Utility Table with Center Support Assembly; U.S. Pat. No. 6,431,092, entitled Portable Folding Utility Table with Center Support and Off-Set Support Legs; U.S. Pat. No. 6,508,184, entitled Lightweight Folding Table with Self-Fixturing Leg Attachment; pending U.S. patent application Ser. No. 10/096,814 entitled Portable Folding Utility Table with Integral Table Top and Lip, filed on Mar. 12, 2002; pending U.S. patent application Ser. No. 10/097,037, entitled Portable Folding Utility Table with Frame Fastened to Inner Surface of Lip, filed on Mar. 12, 2002; and pending U.S. patent application Ser. No. 10/216,342, entitled Table with Blow Molded Top and Pivotally Attached Legs, filed on Aug. 10, 2002; and pending U.S. patent application Ser. No. 10/340,018, entitled Personal Table, filed on Jan. 9, 2003. Each of the patent and applications are incorporated by reference in their entireties.

The table top 12 may include a number of features that facilitate attachment of the legs 18, 20, the cross bar 36 and the frame 40 to the table top. For example, the table top 12 may include mounting members 148 and securing members 152 that are preferably integrally formed in the table top as part of a unitary, one-piece structure. Preferred embodiments of suitable mounting members and securing members are disclosed in Assignee's U.S. Pat. No. 6,530,331, entitled Portable Folding Utility Table with Integral Receiving Members, which is incorporated by reference in its entirety.

As best seen in FIGS. 2 through 7, the bottom surface 16 of table top 12 includes a plurality of depressions 200 that are preferably sized and configured to increase the strength and structural integrity of the table top. The depressions 200 are preferably formed in the bottom surface 16 of the table top 12 and the depressions extend towards the upper surface 14 of the table top. As discussed in more detail below, the ends of the depressions 200 may contact or engage the upper surface 14 of the table top 12, or the ends of the depressions may be spaced from the upper surface of the table top. As shown in the accompanying figures, the depressions 200 preferably cover substantially the entire bottom surface 16 of the table top, but it will be appreciated that the depressions may cover only a portion of the table top. Additionally, while the depressions 200 are shown and described as being located in the bottom surface 16 of the table top 12, the depressions could be formed in any desired portion of the table top.

The depressions 200 are preferably arranged into a predetermined pattern or array in order to increase the strength and structural integrity of the table top 12. In particular, the depressions 200 are preferably spaced closely together and the depressions cover substantially the entire bottom surface 16 of the table top 12. Advantageously, closely spacing the depressions 200 over substantially the entire bottom surface 16 allows a table top 12 with increased strength to be constructed. In addition, it eliminates the elongated ribs and beams that were required in many conventional structures constructed from blow-molded plastic.

Figure 3:
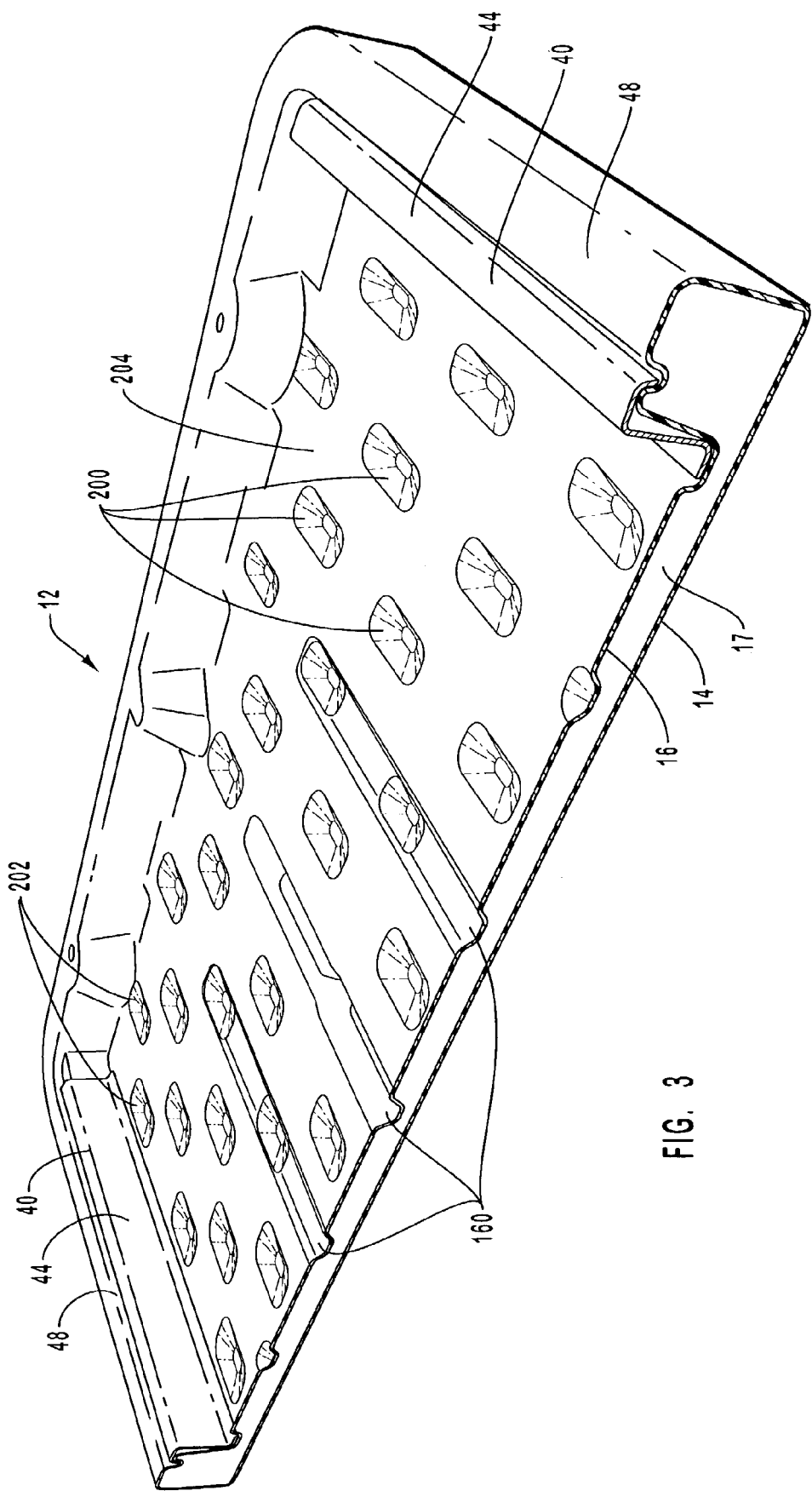
FIG. 3 is a perspective view of a portion of a blow-molded structure in accordance with another embodiment of the invention, illustrating a portion of a blow-molded table top.
Figure 4:
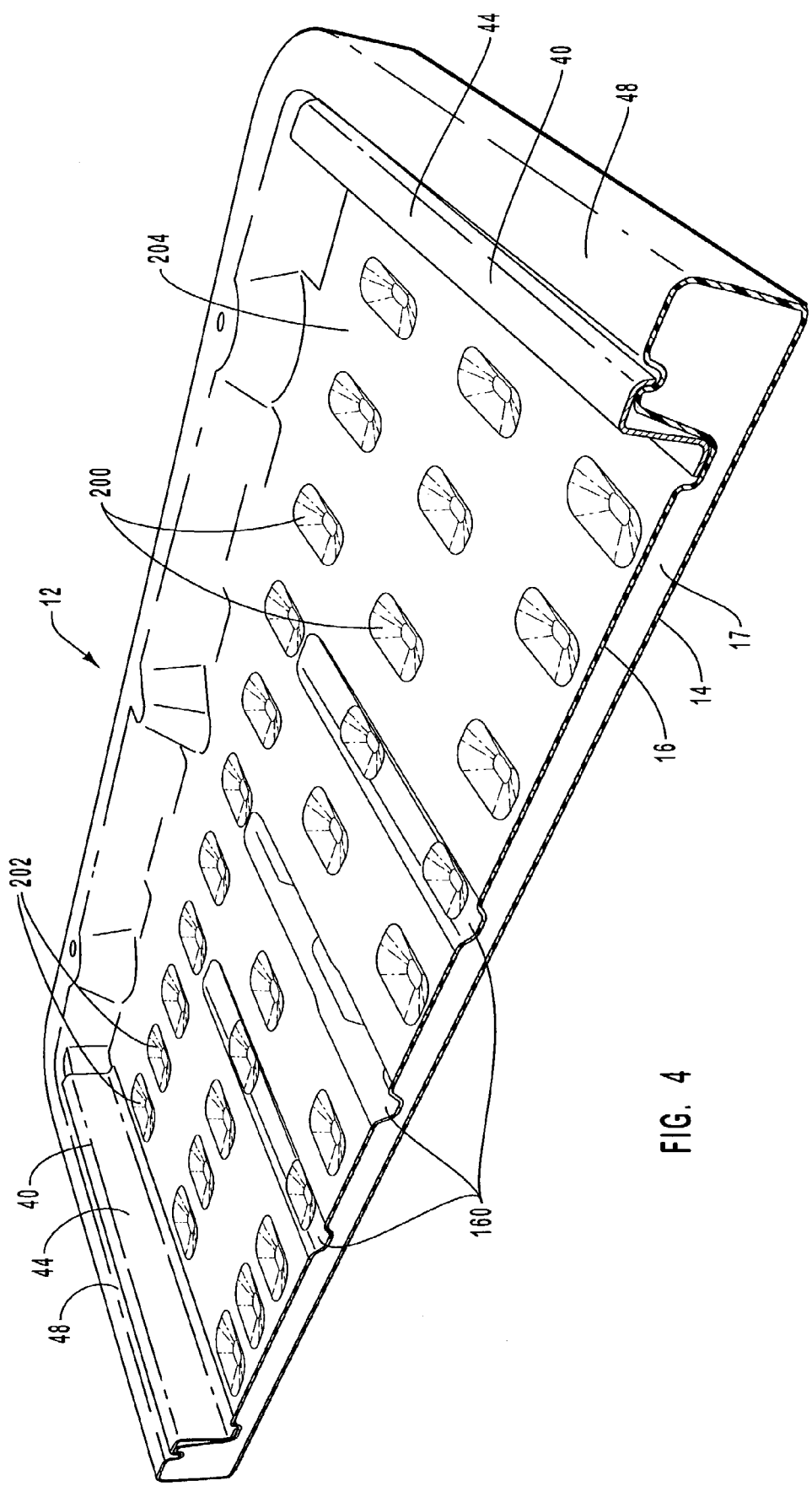
FIG. 4 is a perspective view of a portion of a blow-molded structure in accordance with yet another embodiment of the invention, illustrating a portion of a blow-molded table top.

As shown in FIGS. 3 and 4, the depressions 200 are desirably formed in an array. As shown in FIG. 3, one row 202 of depressions 200 may be staggered with respect to an adjacent row of depressions. On the other hand, as shown in FIG. 4, a row 202 of depressions 200 may be aligned with an adjacent row 202 of depressions 200. It will be appreciated that the depressions 200 may be formed in any suitable pattern or arrangement, including geometric, random, scattered, etc. depending, for example, upon the size and configuration of the table 10.

Desirably, the depressions 200 are formed in a predetermined pattern that minimizes the distance between the depressions. Advantageously, minimizing the distance between the depressions may minimize the unsupported areas of the opposing surface. Minimizing the distance between the depressions 200 may also increase the structural integrity and strength of the blow-molded structure. In addition, minimizing the distance between the depressions 200 may increase the surface smoothness of the opposing surface. Thus, for blow-molded structures such as the table 10 shown in the accompanying figures, the depressions 200 are desirably closely spaced on the bottom surface 16 of the table top 12 such that the depressions are separated by a minimum distance. This creates a table top 12 with greater strength and structural integrity, and the upper surface 14 of the table top may have increased smoothness.

Advantageously, the smaller distance between the depressions 200 increases the structural integrity and strength of the blow-molded structure, which allows the thickness of the outer wall of the blow-molded structure to be decreased. Accordingly, less plastic material may be used to construct the blow-molded plastic structures because of the reduced outer wall thickness. Because less plastic is required to construct the blow-molded structure, that may allow the cost of the structure to be decreased. In addition, the blow-molded structure may cool more quickly during the manufacturing process because of the thinner outer walls. This allows the blow-molded structure to be removed from the mold more quickly and it may allow the structure to be removed at a higher temperature because it dissipates heat more rapidly. Significantly, this may decrease the cycle time required to construct blow-molded structures and it may increase manufacturing efficiency.

Accordingly, increasing the number of depressions 200 and decreasing the distance between the depressions increases the strength and structural integrity of blow-molded structures such as the table top 12. This is contrary to previous blow-molded structures which used strengthening ribs to increase the strength and structural integrity of the structures. Specifically, it was previously believed that stronger blow-molded structures were created by making the walls of the structure thicker and/or adding strengthening ribs. Disadvantageously, the thicker walls and strengthening ribs required more plastic and longer manufacturing time.

Increasing the number of depressions and decreasing the distance between the depressions provides the surprising and unexpected result that less plastic can be used to construct the blow-molded structures. Specifically, it was previously thought that a larger amount of plastic would be required to increase the number of depressions in the blow-molded structure. The increased number of depressions, however, allows thinner outer walls to be used and that allows the overall amount of plastic used to construct the blow-molded structure to be decreased. Additionally, the increased number of closely spaced depressions 200 increases the structural integrity of the structure, despite the fact that disruptions in the continuity of surface were previously thought to weaken the structure.

The depressions 200 are preferably arranged in a predetermined pattern to create a structure with generally uniform characteristics. For example, the depressions 200 are preferably arranged in staggered rows to decrease the distance between the depressions. Additionally, the depressions 200 preferably have a generally constant and uniform spacing across the surface of the structure. In particular, even if other features, objects or items are formed in the surface, the depressions 200 are preferably arranged into a generally uniform and consistent pattern. Thus, one or more depressions may be formed in the other features, objects or items formed in the surface. For example, as shown in FIGS. 3 and 4, depressions 200 may be formed in the channels 160 located in the bottom surface 16 of the table top 12 in order to maintain a generally uniform and consistent pattern. In addition, the depressions 200 may be spaced about these other features, objects or items formed in the surface to keep a generally uniform and consistent pattern. Thus, the depressions are preferably spaced so that the distance between the depressions is minimized, substantially the entire surface is covered with depressions, and the depressions are located in a generally uniform and consistent pattern even if other features, objects or items are formed in the blow-molded structure.

In order to obtain a generally uniform and consistent pattern of depressions, it is desirable to eliminate or minimize other features, objects or items formed in the blow-molded structure. Advantageously, the generally uniform and consistent pattern of depressions can be more easily obtained by eliminating or minimizing the other features, objects and items in the blow-molded structure. Thus, for example, strengthening ribs are preferably eliminated so that they do not interfere or disturb the generally uniform and consistent pattern of depressions.

Figure 5:
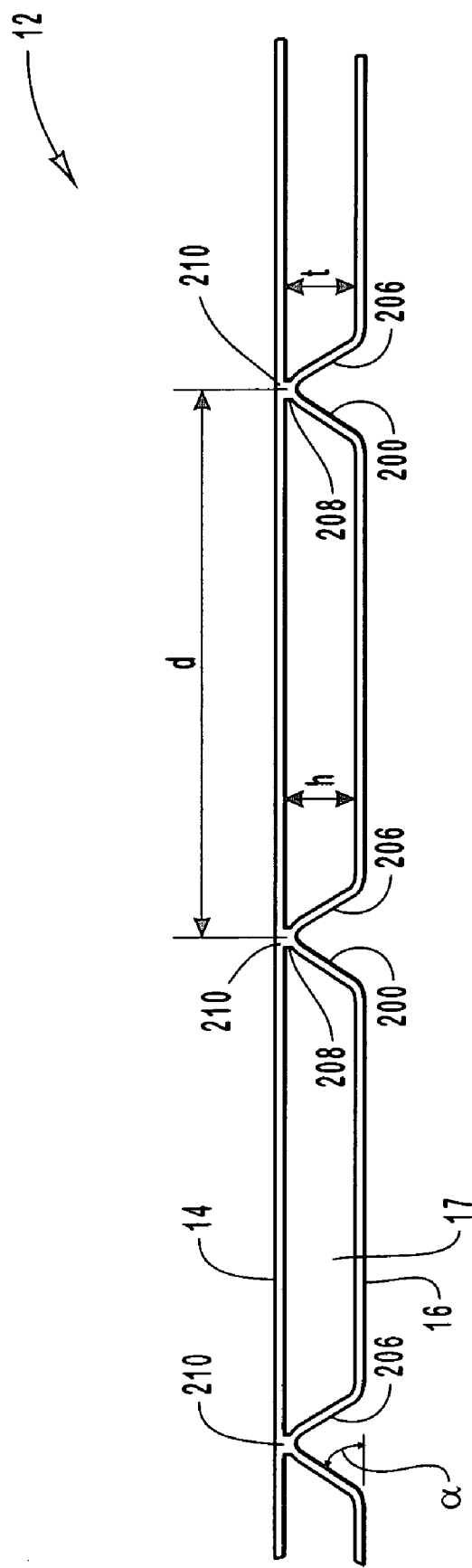
FIG. 5 is a cross-sectional side view of a blow-molded structure in accordance with still another embodiment of the invention, illustrating an end of each of the depressions contacting an opposing surface.

As seen in FIG. 5, the depressions 200 are preferably closely spaced to minimize the distance between the depressions. In particular, the depressions are formed in the bottom surface 16 and the depressions extend towards the upper surface 14 of the table top 12. Each of the depressions includes a side wall 206 and an end 210. As shown in FIG. 5, the ends 210 of the depressions 200 may contact or engage the upper surface 14 of the table top 12. Advantageously, this helps support the upper surface 14 of the table top 12 and the closely spaced depressions 200 minimize the unsupported areas of the upper surface of the table top. The depressions 200 are preferably integrally formed in the table top 12 as part of a unitary, one-piece structure. In particular, the depressions 200 are preferably integrally formed in the table top 12 during the blow-molding process.

The depressions 200 are preferably designed and configured to allow the depressions to be closely spaced. In particular, the side walls 206 of the depressions 200 are preferably formed at a steep angle to allow the depressions to be closely spaced. For example, the side walls 206 of the depressions 200 are preferably at an angle between about 60° and about 85° relative to the lower surface 16 of the table top 12. More preferably, the side walls 206 are positioned at an angle of 75° or greater with respect to the lower surface 16 of the table top 12. It will be appreciated that the side walls 206 may be positioned at any desired angle relative to the lower surface 16 of the table top 12 depending, for example, upon the configuration of the depressions 200 formed in the table top 12.

As seen in FIG. 5, the depressions 200 may have a height h generally equal to a thickness t of the table top 12, where the thickness is the distance separating the lower surface 16 and the upper surface 14. When the depressions 200 have a height h generally equal to the thickness t of the table top 12, the ends 210 of the depressions desirably contact or engage the upper surface 14 of the table top at a contact area 208. It will be appreciated that the size of the contact area 208 may vary, for example, upon the shape and configuration of the depression 200. In addition, as shown in FIG. 5, the depressions 200 are separated by a distance d. The distance d is preferably measured from the center of one depression 200 to the center of another adjacent depression. Desirably, the distance d separating adjacent depressions 200 is generally consistent so that a pattern of depressions with generally uniform and constant spacing is created.

Figure 6:
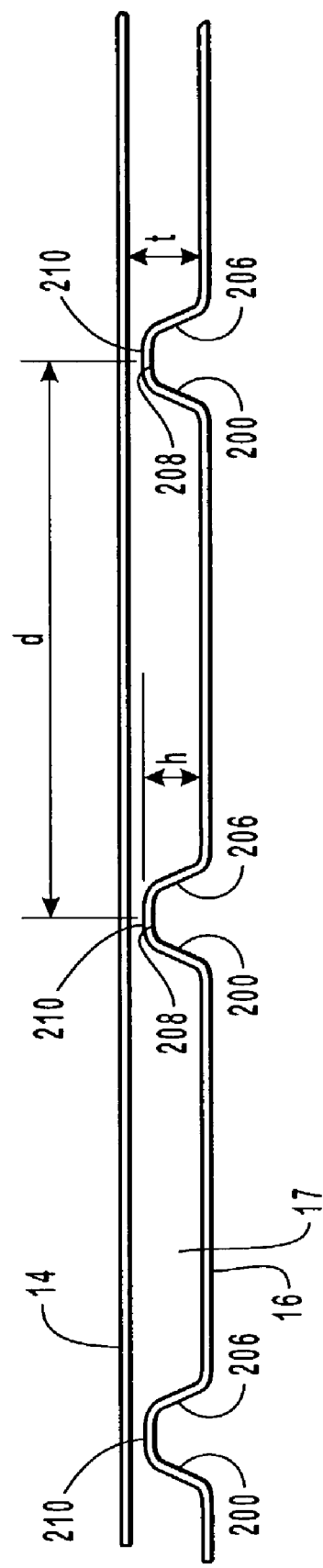
FIG. 6 is a cross-sectional side view of a blow-molded structure in accordance with another embodiment of the invention, illustrating an end of each of the depressions spaced apart from an opposing surface.

As shown in FIG. 6, the ends 210 of the depressions 200 do not have to contact or engage the upper surface 14 of the table top 12. For example, the ends 210 of the depressions 200 may be disposed proximate to, but not joined to, the upper surface 14 of the table top 12. The height h of depressions 200 is the distance from the lower surface 16 to the ends 210 of the depressions. Additionally, one or more of the depressions may be formed in other features formed in the blow-molded structure such as the channels 160 that may be formed in the lower surface 16 of the table top 12. The height h of the depressions 200 formed in the channel 160 is the distance from the plane containing the lower surface 16 of the table top 12 to the ends 210 of the depressions.

As shown in FIG. 5, for example, the table top 12 may have a thickness t of about 1.0 inches. Accordingly, the depressions 210 would have a height h of about 1.0 inches because the depressions extend from the lower surface 16 to the upper surface 14 of the table top 12. On the other hand, if the table top 12 shown in FIG. 6 has a thickness t of about 1.5 inches, then the depressions 210 would have a height h of less than about 1.5 inches, such as about 1.0 inches.

As discussed above, the distance d separating the depressions 200 is preferably minimized and the depressions are preferably located in a generally uniform and consistent arrangement so that the table top 12 is lightweight, high-strength structure with relatively uniform properties. In particular, the depressions 200 are preferably arranged in a tightly packed array that covers substantially all the lower surface 16 of the table top 12. For example, in order to create a tightly packed array of depressions 200, the distance d between adjacent depressions is preferably less than or equal to three times the thickness t of the table top 12, as shown in FIG. 7. In order to create a more tightly packed array of depression 200, the distance d between adjacent depressions is preferably less than or equal to two times the thickness t of the table top 12. The distance d between adjacent depressions 200 may also be equal to or less than the thickness t of the table top 12. Additionally, the distance d between adjacent depressions 200 may be less than or equal to three times the height h of the table top 12. Further, the distance d between adjacent depressions may be two or less times than the height h of the table top 12. Finally, the distance d between adjacent depressions may be equal to or less than the height h of the table top 12.

As discussed above, previous blow-molded structures often incorporated one or more reinforcing ribs or beams to provide increased strength and support for blow-molded structures such as table top 12. The foregoing description, however, provides for the surprising and unexpected result that an increased number of depressions that are closely spaced together creates a stronger and lighter weight table top 12. Preferably, the depressions are consistently spaced over substantially all the entire surface of table top 12 so that substantially the entire surface of table top 12 is provided with increased strength and structural integrity. Desirably, any reinforcing ribs or beams are eliminated so that the depressions can cover substantially the entire surface. It will be appreciated, however, that only a portion of the table top 12 may have a plurality of closely spaced depressions in order to provide increased structural strength to only those particular portions of table top 12.

The increased number of closely spaced depressions may also allow blow-molded structures to be created with a smoother, more planar outer surface. Advantageously, the more planar surface may be used to create a number of suitable objects such as the table tops described above.

As shown in FIG. 8, a basketball backboard 250 may be constructed from a blow-molded plastic and it may be constructed with an increased number of depressions that are spaced closely together to create a backboard with increased strength and structural integrity. In addition, the basketball backboard 250 may be constructed with a thinner outer wall, which decreases the amount of plastic required to construct the backboard. The thinner outer wall may also allow the backboard to be constructed more rapidly because it may be removed from the mold more quickly and at a higher temperature.

The backboard 250 is preferably a unitary structure with a top rail 252, a bottom rail 254, a first side rail 256 and a second side rail 258. The backboard 250 also includes a support structure 260 disposed between the rails 252, 254, 256, 258. The support structure 260 desirably has a generally H-shaped configuration with a first vertical rail 262, a second vertical rail 264 and a horizontal rail 266. The backboard 250 desirably includes a plurality of depressions 200 formed in each of the rails 252, 254, 256, 258, 262, 264, 266. It will be understood that while the depressions 200 can be formed in any desired portions of the backboard 250, the depressions are preferably formed in substantially all of the structural portions of the backboard.

The depressions 200 are preferably formed in a rear surface 268 of the backboard 250 so that they are not visible while playing basketball. The depressions 200, however, may be formed in any suitable portions of the backboard 250. In addition, the depressions 200 may be formed on both the front surface 270 and the rear surface of the backboard 268. As seen in FIG. 9, the depressions 200 formed in the front surface 270 and rear surface 268 of the frame 250 are preferably generally aligned and the ends of the depressions are preferably in contact or engaged. It will be appreciated that the ends of the depressions 200 could also be spaced apart and the depressions do not have to be aligned.

The present invention may be embodied in other specific forms without departing from its spirit or essential characteristics. The described embodiments are to be considered in all respects only as illustrative and not restrictive. The scope of invention is, therefore, indicated by appended claims rather than by foregoing description. All changes which come within meaning and range of equivalency of claims are to be embraced within their scope.

What is claimed is:

1. A table top constructed from blow-molded plastic and including a hollow interior portion formed during the blow-molding process, the blow-molded plastic table top comprising:
   a first surface;
   a second surface that is disposed generally parallel to and spaced apart from the first surface, the first surface being separated from the second surface by a distance, the first and second surfaces enclosing at least a portion of the generally hollow interior of the blow-molded structure;
   a plurality of depressions formed in the second surface and extending towards the first surface, each of the plurality of depressions including a sidewall and an end, each of the plurality of depressions having a height measured from the second surface to the end of the depression, the plurality of depressions being arranged into a generally uniform pattern that covers at least a substantial portion of the second surface in which a distance separating adjacent depressions is approximately equal to or less than three times the distance separating the first surface and the second surface.

2. The blow-molded plastic table top as in claim 1, wherein an end of at least a majority of the plurality of depressions engages the first surface.

3. The blow-molded plastic table top as in claim 1, wherein the sidewall of each of the plurality of depressions is at an angle between about 60° and about 85° relative to the second surface.

4. The blow-molded plastic table top as in claim 1, wherein the plurality of depressions cover substantially the entire second surface.

5. The blow-molded plastic table top as in claim 1, wherein the plurality of depressions allow a thickness of the first surface and the second surface to be decreased.

6. The blow-molded plastic table top as in claim 1, wherein the plurality of depressions have a generally uniform configuration, a generally consistent spacing between adjacent depressions, and the depressions cover substantially all the second surface of the blow-molded structure.

7. The blow-molded plastic table top as in claim 1, wherein the plurality of depressions have a generally uniform configuration, a generally consistent spacing between adjacent depressions, the depressions cover substantially all the second surface of the blow-molded structure, and the depressions being sized and configured to support the first surface in a generally consistent manner so that the blow-molded structure has generally uniform strength and structural integrity.

8. A table top constructed from blow-molded plastic and including a hollow interior portion formed during the blow-molding process, the blow-molded plastic table top comprising:
   a first surface;
   a second surface that is disposed generally parallel to and spaced apart from the first surface, the first surface being separated from the second surface by a distance, the first and second surfaces enclosing at least a portion of the generally hollow interior of the blow-molded structure;
   a plurality of depressions formed in the second surface and extending towards the first surface, each of the plurality of depressions including a sidewall and an end, each of the plurality of depressions having a height measured from the second surface to the end of the depression, the plurality of depressions being arranged into a generally uniform pattern in which a distance separating adjacent depressions is generally equal to or less than two times the distance separating the first surface and the second surface.

9. A table top constructed from blow-molded plastic and including a hollow interior portion formed during the blow-molding process, the blow-molded plastic table top comprising:
   a first surface;
   a second surface that is disposed generally parallel to and spaced apart from the first surface, the first surface being separated from the second surface by a distance, the first and second surfaces enclosing at least a portion of the generally hollow interior of the blow-molded structure;
   a plurality of depressions formed in the second surface and extending towards the first surface, each of the plurality of depressions including a sidewall and an end, each of the plurality of depressions having a height measured from the second surface to the end of the depression, the plurality of depressions being arranged into a generally uniform pattern in which a distance separating adjacent depressions is generally equal to or less than the distance separating the first surface and the second surface.

10. The blow-molded plastic table top as in claim 1, wherein the end of at least a majority of the plurality of depressions is spaced apart from the first surface.

11. The blow-molded plastic table top as in claim 1, wherein the plurality of depressions are integrally formed in the blow-molded plastic structure as part of a unitary, one-piece structure; and wherein the plurality of depressions have a generally circular or oval configuration to allow the depressions to be closely spaced.

12. A portion of a table comprising:
   a table top constructed from blow-molded plastic and including a generally hollow interior portion that is formed during the blow-molding process, the table top including an upper surface, a lower surface and a thickness measured from the upper surface to the lower surface; and
   a plurality of depressions integrally formed in the lower surface of the table top as part of a unitary, one-piece structure, the plurality of depressions being arranged into a generally uniform pattern that covers at least a substantial portion of the lower surface of the table top, each of the plurality of depressions including an end that is disposed towards the upper surface of the table top and is sized and configured to help support the upper surface of the table top, each adjacent depression of the plurality of depressions being separated by a distance that is generally equal to or less than three times the thickness of the table top.

13. The portion of a table as in claim 12, wherein the end of at least a majority of the plurality of depressions engages the upper surface of the table top.

14. The portion of a table as in claim 12, wherein the end of at least a majority of the plurality of depressions is spaced apart from the upper surface of the table top.

15. The portion of a table as in claim 12, wherein each of the plurality of depressions has a sidewall that is at an angle of at least about 75° with respect to the lower surface.

16. The portion of a table as in claim 12, wherein the plurality of depressions cover substantially the entire lower surface of the table top.

17. The portion of a table as in claim 12, wherein the plurality of depressions have a generally uniform configuration, a generally consistent spacing between adjacent depressions, and the depressions cover substantially all the lower surface of the table top.

18. A portion of a table comprising:
a table top constructed from blow-molded plastic and including a generally hollow interior portion that is formed during the blow-molding process, the table top including an upper surface, a lower surface and a thickness measured from the upper surface to the lower surface;
a plurality of depressions integrally formed in the lower surface of the table top as part of a unitary, one-piece structure, the plurality of depressions being arranged into a generally uniform pattern that covers at least a substantial portion of the lower surface of the table top, each of the plurality of depressions including an end that is disposed towards the upper surface of the table top and is sized and configured to help support the upper surface of the table top, each adjacent depression of the plurality of depressions being separated by a distance that is generally equal to or less than two times the thickness of the table top.

19. A portion of a table comprising:
a table top constructed from blow-molded plastic and including a generally hollow interior portion that is formed during the blow-molding process, the table top including an upper surface, a lower surface and a thickness measured from the upper surface to the lower surface;
a plurality of depressions integrally formed in the lower surface of the table top as part of a unitary, one-piece structure, the plurality of depressions being arranged into a generally uniform pattern that covers at least a substantial portion of the lower surface of the table top, each of the plurality of depressions including an end that is disposed towards the upper surface of the table top and is sized and configured to help support the upper surface of the table top, each adjacent depression of the plurality of depressions being separated by a distance that is generally equal to or less than the thickness of the table top.

20. A portion of a table comprising:
a table top constructed from blow-molded plastic and including a generally hollow interior portion formed during the blow-molding process, the table top including an upper surface, a lower surface and a thickness measured from the upper surface to the lower surface;
a plurality of depressions integrally formed in the lower surface of the table top as part of a unitary, one-piece structure, the plurality of depressions having a generally uniform configuration and being arranged into a generally uniform pattern that covers at least a substantial portion of the lower surface of the table top, the plurality of depressions including a generally consistent spacing between adjacent depressions, each of the plurality of depressions including an end that is disposed towards the upper surface of the table top and is sized and configured to help support the upper surface of the table top, each of the plurality of depressions having a height generally measured from the lower surface to the end of the depression, each adjacent depression of the plurality of depressions being separated by a distance that is generally equal to or less than three times the thickness of the table top.

21. The portion of a table as in claim 20, further comprising one or more channels disposed in the lower surface of the table top, the channels having a depth less than the thickness of the table top.

22. The portion of a table as in claim 20, further comprising at least one depression at least partially disposed in the at least one of the channels disposed in the lower surface of the table top.

23. A table top comprising:
a table top constructed from blow-molded plastic and including a generally hollow interior portion formed during the blow-molding process, the table top including an upper surface, a lower surface and a thickness measured from the upper surface to the lower surface; and
a plurality of depressions integrally formed in the lower surface of the table top as part of a unitary, one-piece structure, the plurality of depressions having a generally uniform configuration and being arranged into a generally uniform pattern that covers at least a substantial portion of the lower surface of the table top, the plurality of depressions including a generally consistent spacing between adjacent depressions, each of the plurality of depressions including an end that is disposed towards the upper surface of the table top and is sized and configured to help support the upper surface of the table top, each of the plurality of depressions having a height generally measured from the lower surface to an end of the depression, each adjacent depression of the plurality of depressions being separated by a distance that is generally equal to or less than two times the thickness of the table top.

24. A table top comprising:
a table top constructed from blow-molded plastic and including a generally hollow interior portion formed during the blow-molding process, the table top including an upper surface, a lower surface and a thickness measured from the upper surface to the lower surface;
a plurality of depressions integrally formed in the lower surface of the table top as part of a unitary, one-piece structure, the plurality of depressions having a generally uniform configuration and being arranged into a generally uniform pattern that covers at least a substantial portion of the lower surface of the table top, the plurality of depressions including a generally consistent spacing between adjacent depressions, each of the plurality of depressions including an end that is disposed towards the upper surface of the table top and is sized and configured to help support the upper surface of the table top, each of the plurality of depressions having a height generally measured from the lower surface to an end of the depression, each adjacent depression of the plurality of depressions being separated by a distance that is generally equal to or less than the thickness of the table top.

25. A portion of a table comprising:
a table top constructed from blow-molded plastic and including a generally hollow interior portion that is formed during the blow-molding process, the table top including an upper surface, a lower surface and a thickness measured from the upper surface to the lower surface; and
a plurality of depressions integrally formed in the lower surface of the table top as part of a unitary, one-piece structure, the plurality of depressions being arranged into a generally uniform pattern that covers at least a substantial portion of the lower surface of the table top, each adjacent depression of the plurality of depressions being separated by a distance that is generally equal to or less than three times the thickness of the table top.

26. A portion of a table comprising:

a table top constructed from blow-molded plastic and including a generally hollow interior portion that is formed during the blow-molding process, the table top including an upper surface, a lower surface and a thickness measured from the upper surface to the lower surface;

a plurality of depressions integrally formed in the lower surface of the table top as part of a unitary, one-piece structure, the plurality of depressions being arranged into a generally uniform pattern that covers at least a substantial portion of the lower surface of the table top, each adjacent depression of the plurality of depressions being separated by a distance that is generally equal to or less than two times the thickness of the table top.

27. A portion of a table comprising:

a table top constructed from blow-molded plastic and including a generally hollow interior portion that is formed during the blow-molding process, the table top including an upper surface, a lower surface and a thickness measured from the upper surface to the lower surface;

a plurality of depressions integrally formed in the lower surface of the table top as part of a unitary, one-piece structure, the plurality of depressions being arranged into a generally uniform pattern that covers at least a substantial portion of the lower surface of the table top, each adjacent depression of the plurality of depressions being separated by a distance that is generally equal to or less than the thickness of the table top.

28. A portion of a table comprising:

a table top constructed from blow-molded plastic and including a generally hollow interior portion formed during the blow-molding process, the table top including an upper surface, a lower surface and a thickness measured from the upper surface to the lower surface;

a plurality of depressions integrally formed in the lower surface of the table top as part of a unitary, one-piece structure, the plurality of depressions having a generally uniform configuration and being arranged into a generally uniform pattern that covers at least a substantial portion of the lower surface of the table top, the plurality of depressions including a generally consistent spacing between adjacent depressions, each of the plurality of depressions including an end that is disposed towards the upper surface of the table top and is sized and configured to help support the upper surface of the table top so that the upper surface of the table top has generally uniform strength and structural integrity, each of the plurality of depressions having a height generally measured from the lower surface to the end of the depression, each adjacent depression of the plurality of depressions being separated by a distance that is generally equal to or less than three times the thickness of the table top.

29. A table top comprising:

a table top constructed from blow-molded plastic and including a generally hollow interior portion formed during the blow-molding process, the table top including an upper surface, a lower surface and a thickness measured from the upper surface to the lower surface; and a plurality of depressions integrally formed in the lower surface of the table top as part of a unitary, one-piece structure, the plurality of depressions having a generally uniform configuration and being arranged into a generally uniform pattern that covers at least a substantial portion of the lower surface of the table top, the plurality of depressions including a generally consistent spacing between adjacent depressions, each of the plurality of depressions including an end that is disposed towards the upper surface of the table top and is sized and configured to help support the upper surface of the table top so that the upper surface of the table top has generally uniform strength and structural integrity, each of the plurality of depressions having a height generally measured from the lower surface to an end of the depression, each adjacent depression of the plurality of depressions being separated by a distance that is generally equal to or less than two times the thickness of the table top.

30. A table top comprising:

a table top constructed from blow-molded plastic and including a generally hollow interior portion formed during the blow-molding process, the table top including an upper surface, a lower surface and a thickness measured from the upper surface to the lower surface;

a plurality of depressions integrally formed in the lower surface of the table top as part of a unitary, one-piece structure, the plurality of depressions having a generally uniform configuration and being arranged into a generally uniform pattern that covers at least a substantial portion of the lower surface of the table top, the plurality of depressions including a generally consistent spacing between adjacent depressions, each of the plurality of depressions including an end that is disposed towards the upper surface of the table top and is sized and configured to help support the upper surface of the table top so that the upper surface of the table top has generally uniform strength and structural integrity, each of the plurality of depressions having a height generally measured from the lower surface to an end of the depression, each adjacent depression of the plurality of depressions being separated by a distance that is generally equal to or less than the thickness of the table top.

\* \* \* \* \*

UNITED STATES PATENT AND TRADEMARK OFFICE
CERTIFICATE OF CORRECTION

| | |
|---|---|
| PATENT NO. | : 7,069,865 B2 |
| APPLICATION NO. | : 10/409000 |
| DATED | : July 4, 2006 |
| INVENTOR(S) | : Strong et al. |

Page 1 of 1

It is certified that error appears in the above-identified patent and that said Letters Patent is hereby corrected as shown below:

<u>Column 1</u>
Line 59, change "table a top" to --table top--

<u>Column 3</u>
Line 6, change "such tables" to --such as tables--
Line 47, change "structures, also" to --structures, which also--

<u>Column 6</u>
Line 65, change "58" to --48--

<u>Column 11</u>
Line 39, change "210" to --200--
Line 43, change "210" to --200--

<u>Column 12</u>
Line 64, before "invention", insert --the--
Line 66, before "claims", insert --the--

Signed and Sealed this

Twentieth Day of February, 2007

JON W. DUDAS
*Director of the United States Patent and Trademark Office*

UNITED STATES PATENT AND TRADEMARK OFFICE
CERTIFICATE OF CORRECTION

PATENT NO. : 7,069,865 B2
APPLICATION NO. : 10/409000
DATED : July 4, 2006
INVENTOR(S) : Strong et al.

It is certified that error appears in the above-identified patent and that said Letters Patent is hereby corrected as shown below:

Drawings
Sheet 3, replace FIG. 3 with the figure depicted herein below wherein the table has been labeled --10-- and the side rail has been labeled --42--

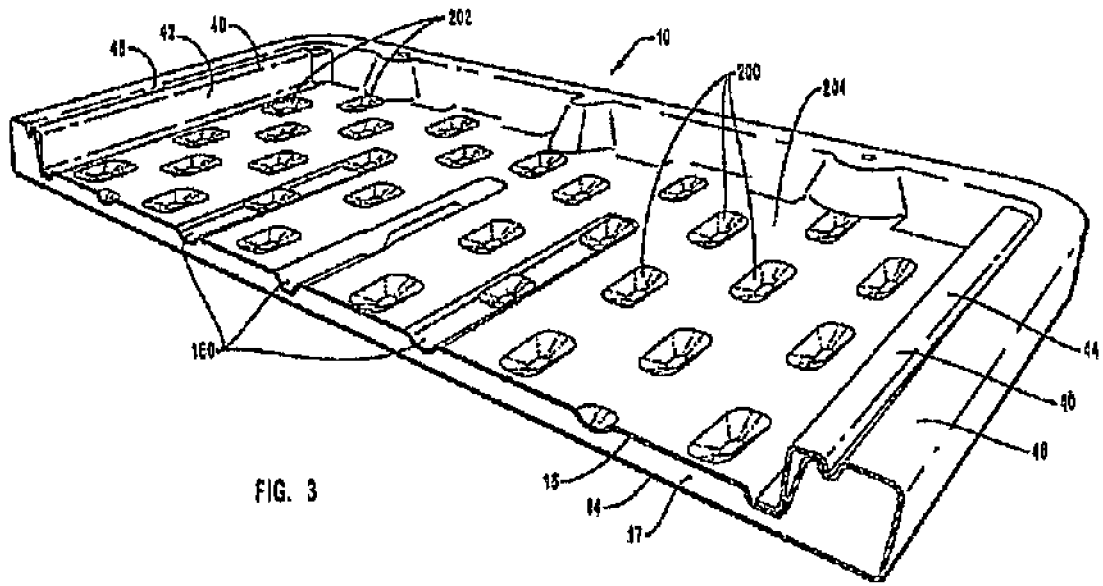
FIG. 3

Drawings
Sheet 4, replace FIG. 4 with the figure depicted herein below wherein the table has been labeled --10-- and the side rail has been labeled --42--

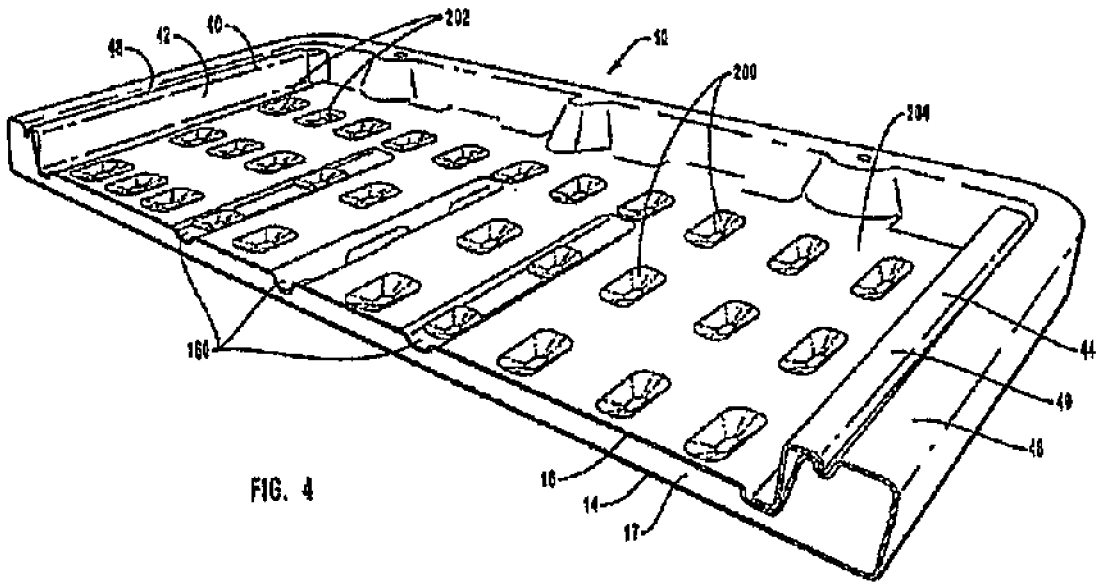
FIG. 4

UNITED STATES PATENT AND TRADEMARK OFFICE
CERTIFICATE OF CORRECTION

PATENT NO. : 7,069,865 B2
APPLICATION NO. : 10/409000
DATED : July 4, 2006
INVENTOR(S) : Strong et al.

It is certified that error appears in the above-identified patent and that said Letters Patent is hereby corrected as shown below:

Column 1
Line 59, change "table a top" to --table top--

Column 3
Line 6, change "such tables" to --such as tables--
Line 47, change "structures, also" to --structures, which also--

Column 6
Line 65, change "58" to --48--

Column 11
Line 39, change "210" to --200--
Line 43, change "210" to --200--

Column 12
Line 64, before "invention", insert --the--
Line 66, before "claims", insert --the--

This certificate supersedes Certificate of Correction issued February 20, 2007.

Signed and Sealed this

Sixteenth Day of October, 2007

JON W. DUDAS
*Director of the United States Patent and Trademark Office*